Figure 1:
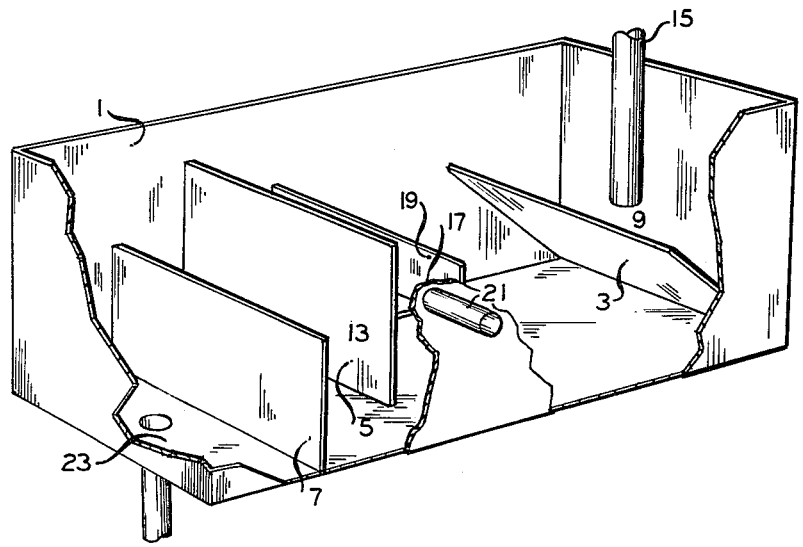

United States Patent [19]

Van Pool et al.

[11] 4,111,805
[45] Sep. 5, 1978

[54] SEPARATION OF SOLVENT FROM LIQUID SULFUR

[75] Inventors: Joe Van Pool; R. Neil Jackson, both of Bartlesville, Okla.

[73] Assignee: Phillips Petroleum Company, Bartlesville, Okla.

[21] Appl. No.: 714,930

[22] Filed: Aug. 16, 1976

[51] Int. Cl.² .................. B01D 36/18; C02B 1/02
[52] U.S. Cl. ..................... 210/71; 23/308 S; 210/73 R; 210/83; 210/522; 210/532 R; 210/540; 423/575
[58] Field of Search ............... 210/525, 532, 538, 540, 210/71, 72, 73 R, 73 W, 83, 84, 533–537, 521, 522; 23/267 S, 308 S; 423/575

[56] References Cited

U.S. PATENT DOCUMENTS

| | | | |
|---|---|---|---|
| 2,642,995 | 6/1953 | Brenner | 210/540 |
| 2,782,929 | 2/1957 | Colket | 210/540 |
| 3,278,041 | 10/1966 | Wride et al. | 210/532 R |
| 3,306,446 | 2/1967 | Lewis | 23/308 S |
| 3,454,608 | 7/1969 | Seip | 260/425 |
| 3,731,802 | 5/1973 | James | 210/540 |
| 3,796,796 | 3/1974 | Deschamps et al. | 423/575 |
| 3,971,719 | 7/1976 | Peters | 210/540 |

Primary Examiner—Frank Sever

[57] ABSTRACT

A method and apparatus for separating solvent from liquid sulfur. The invention entails introducing an emulsion of liquid sulfur and a solvent of lower specific gravity into a first zone of a separator segregating the emulsion behind a sloped baffle to allow breaking of the emulsion with the solvent rising above the sulfur to form a separate layer of liquid; restraining the liquid sulfur behind a second baffle having sufficient clearance from the floor of the vessel to allow sulfur to flow thereunder while forming a second zone of liquid behind this baffle in which a collecting chamber is arranged so that solvent flows from a separated upper layer of liquid over a trapout weir into the chamber to be removed; and downstream of the second baffle a restraining weir of sufficient height to maintain an operating level in the second zone allowing the overflow of solvent into the collecting chamber with liquid sulfur overflowing the restraining weir into a collection means.

5 Claims, 2 Drawing Figures

U.S. Patent  Sept. 5, 1978  4,111,805

SEPARATION OF SOLVENT FROM LIQUID SULFUR

BACKGROUND OF THE INVENTION

This invention relates to separation. According to one aspect of the invention it relates to the separation of an organic solvent material from liquid sulfur. In another aspect of the invention it relates to a baffled separation means for separating immiscible liquids. In another aspect of the invention it relates to the recovery of liquid sulfur having minimal contamination with solvent and catalyst used in the process for producing the sulfur.

U.S. Pat. No. 3,796,796 discloses a process in which sulfur is obtained by reacting hydrogen sulfide with sulfur dioxide in contact with a liquid phase containing a selected alcohol, polyol, polyalkyleneglycol or ether and also containing a catalyst which is both a partial ester and a partial salt of a metal of Groups I-A and II-A of the Periodic Table of elements reacted with an organic polycarboxylic acid with at least one acid group esterified by the selected alcohol, polyol, polyalkyleneglycol or ether. In the process, contact is made in a packed tower between hydrogen sulfide and sulfur dioxide passing upwards as gases and the liquid solvent with contained catalyst passing downward through the packing. In the reaction elemental sulfur is released and washed downward through the column with the solvent and the catalyst contained in the solvent. The majority of the solvent and catalyst is collected in the base of the tower and recirculated through the tower. The elemental sulfur, being heavier than the solvent, is also collected in the base of the tower and removed. There is some solvent with its contained catalyst removed along with the sulfur from the base of the tower. At times of upset operation the amount of solvent removed with the sulfur increases.

It has been discovered that passage of the liquid sulfur collected from the base of the tower through a relatively simple separation apparatus can considerably reduce the amount of solvent that finds its way with the liquid sulfur to product storage.

It is therefore an object of the this invention to provide an apparatus for the separation of solvent from liquid sulfur. It is also an object of this invention to provide a method for separating solvent from liquid sulfur.

Other aspects, objects, and the various advantages of this invention will become apparent upon studying this specification, the drawings, and the attached claims.

STATEMENT OF THE INVENTION

According to this invention an apparatus is provided for separating liquid sulfur and a solvent of lesser specific gravity which can contain a catalyst composition. The apparatus comprises a vessel that is divided by baffles into three separate zones. The first zone is defined by a sloping baffle so arranged with the walls of the vessel that inlet flow is contained therebehind. The second zone, which contains the first zone, is defined by a second baffle elevated sufficiently above the floor of the vessel and arranged with the other walls to provide a passage for flow beneath the baffle. This second baffle is of sufficient height to collect liquid therebehind at a level above the top of the sloping baffle. Within the second zone defined by the second baffle is a collection chamber open at its top at a trapout weir elevated above the top of the sloped baffle. Downstream of the second baffle is a restraining weir defining a third zone between the second baffle and the restraining weir with this weir of sufficient height to maintain a level of liquid in the second zone to overflow liquid into the collection chamber and with liquid overflowing the restraining weir into a collection means.

In another aspect of the invention a method is provided for separating liquid sulfur and a liquid solvent of lower specific gravity. An emulsion of liquid sulfur and solvent is introduced into a first zone behind a sloped baffle and maintained in this zone for a time sufficient to allow breaking of the emulsion with rising of the solvent to the surface of the liquid sulfur. The separated liquids form stratified layers in a second zone, which contains the first zone, with the liquid restrained by a baffle of sufficient height to prevent flow over the top thereof, but allowing flow of liquid sulfur beneath the baffle into a third zone. In the second zone liquid is overflowed into a collection chamber over a trapout weir with the overflowed liquid removed from the chamber. The liquid sulfur that flows under the second baffle is contained in a third zone behind a restraining weir that is of sufficient height to maintain a level in the second zone that allows overflowing of separated solvent into the collecting chamber while overflowing liquid sulfur from the third zone into a collecting means by which the sulfur can be transported to storage.

Sulfur melts at 238° F. (114° C.). The apparatus of this invention will, therefore, be supplied with means to maintain the temperature in the apparatus in the range of about 240° to about 310° F. (116°–154° C.). This broad temperature range is chosen because in the lower temperature range above 238° F. (114° C.) liquid sulfur has a relatively low viscosity while in the upper temperature range, at about 315° F. (157° C.), liquid sulfur is too viscous to allow phase separation from the solvents contemplated for use. With viscosity as a main consideration, a preferred temperature range for operation is about 260° to about 300° F. (127°–149° C.) with a most preferred narrow range of about 270° to about 275° F. (132°–134° C.). Since good operation can be expected at atmospheric pressure, it can be stated that the pressure of operation is not critical.

Although this invention should work well with any solvent that has a specific gravity less than that of the liquid sulfur or should work well for phase separation of any liquids having characteristics similar to the solvent and liquid sulfur that will be described below, the invention is intended mainly for the separation of elemental sulfur and a liquid phase solvent such as that set out in U.S. Pat. No. 3,796,796 in a process for manufacturing elemental sulfur by reacting hydrogen sulfide with sulfur dioxide. In that patent the liquid phase, that we have here designated as solvent, is described as essentially containing a compound of the formula R—OH in which the R is a radical selected from:

the aliphatic hydrocarbon radicals of 8–40 carbon atoms, the aliphatic hydrocarbon radicals of 8–40 carbon atoms with 1 to 3 hydroxy substituents, and the radicals of the formula:

$$R_1-(O-R_2)_n-$$

in which $R_1$ is hydrogen or a monovalent aliphatic hydrocarbon radical of 1–20 carbon atoms, $R_2$ is a divalent aliphatic hydrocarbon radical of 2–10 carbon atoms and $n$ is an integer from 1 to 20.

As stated in that patent, the liquid phase can also contain a catalyst consisting of a salt formed between a metal of Groups I-A and II-A of the Periodic Table of the elements and an organic polycarboxylic acid at least one acid group of which is esterified by the compound R—OH. Since this catalyst is soluble in the solvent for the purposes of the invention, the separation is considered to be between the sulfur and the solvent.

Some examples of solvents that can be separated from liquid sulfur by the process of this invention are: 1-octanol, 1-dodecanol, 1-hexadecanol, 1-eicosanol, 9-heptadecanol, 1,4-heptadecanediol, 1,4,8-pentadecane triol, penta-ethylene glycol, hexaethylene glycol, octaethylene glycol, diethylene glycol, triethylene glycol, polyethylene glycol of an average molecular weight of 400, tripropylene glycol, propylene glycol, polypropylene glycol of an average molecular weight of 600, mono ethyl ether of octaethylene glycol, monobutyl ether of tetrapropylene glycol, monomethyl ether of polyethylene glycol of an average molecular weight of 400, mono ethyl ether of tetrapropylene glycol.

The invention can best be understood in conjunction with the drawing in which

Figure 2:
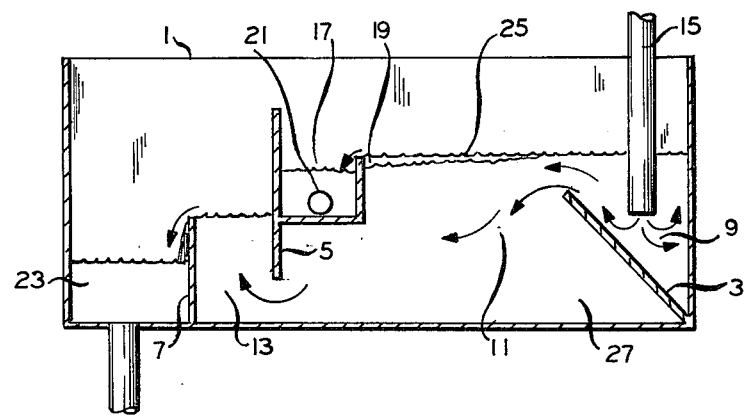

FIG. 1 is a partially cut-away, perspective view of the apparatus of this invention and FIG. 2 is a cut-away side view of the apparatus of this invention containing liquids.

Referring now to FIG. 1, in a preferred embodiment of the invention, the apparatus is depicted as a polyhedral vessel 1 that is divided by baffles 3, 5 and a weir 7 into a series of zones 9, 11, 13. The first zone 9 is defined by the sidewalls of the vessel and a sloped baffle 3. The sloped baffle 3 provides a barrier behind which inlet fluid is delivered through inlet line 15. This baffle is angled to carry the flow up and away from the zone of entry to provide quieting of the turbulence and encourage release of the lighter material from the heavier liquid.

A second baffle 5 provides a barrier sufficiently tall to prevent liquid from overflowing the barrier in normal operation and providing an opening between the bottom of the vessel and the lower edge of baffle 5 for flow of heavy liquid under the barrier. The second baffle 5 defines a second zone 11 which actually includes the first zone 9.

Within the second zone 11 and spaced sufficiently above the top of sloping baffle 3 and close to second baffle 5 to allow maintenance of a liquid level of separated solvent is a collecting chamber 17 having a trapout weir 19 of sufficient height to provide maintenance of a liquid level of solvent above the top of sloping baffle 3 and also allowing flow of heavier liquid sulfur through second zone 11. The collecting chamber 17 is shown here connected to second baffle 5 as a convenient and economical arrangement for construction. Means for removing liquid from the collecting chamber 17 is shown as pipe 21.

Downstream of second baffle 5 is a restraining weir 7 which is of sufficient height to maintain an operating liquid level in second zone 11. Restraining weir 7 maintains a third zone 13 of heavy liquid which overflows into a means 23 for collecting and removing the heavy liquid. As stated above, for the purpose of this invention, suitable means would be provided for maintaining the temperature within the apparatus.

Referring now to FIG. 2, operation of this process will be described. An emulsion of solvent and liquid sulfur enters the first zone 9 through the inlet line 15. This emulsion is retained behind the sloping baffle 3 for a time sufficient to break the emulsion and allow the lighter liquid to rise to the surface of the heavier liquid thereby forming two distinct strata of lighter liquid 25 floating on the heavier liquid 27. The level of heavier liquid 27 is maintained by restraining weir 7 to provide a liquid level in the second zone 11 from which the lighter liquid 25 overflows the trapout weir 19 into the collecting chamber 17 from which it is removed by pipe 21. The heavier liquid sulfur flows under second baffle 5 into the third zone 13 and overflows the restraining weir 7 into a collecting and removing means 23.

In a typical operation in which polyethylene glycol is the solvent being separated from the liquid sulfur a material balance as set out below in Table I exists.

TABLE I

| Feed to Separator (15): | |
|---|---|
| Sulfur, #/hr., | 750 |
| Polyethylene Glycol, #/hr., | 10 |
| Total, #/hr., | 760 |
| Sulfur Outlet (23): | |
| Sulfur, #/hr., | 749.6 |
| Polyethylene Glycol (500 ppm by wt.), #/hr., | 0.4 |
| Total, #/hr., | 750 |
| Polyethylene Glycol Outlet (21): | |
| Sulfur (4 wt. %), #/hr., | 0.4 |
| Polyethylene Glycol, #/hr., | 9.6 |
| Total, #/hr., | 10 |

It will be noted that this process provides means by which a lighter solvent can be effectively and economically removed from a stream comprising liquid sulfur and the lighter solvent liquid.

We claim:

1. A method for separating liquid sulfur from a liquid solvent of lower specific gravity comprising:
   (a) charging an emulsion of liquid sulfur which contains an immiscible solvent of specific gravity lower than said sulfur into a first section of a heated vessel, said first section comprising an outwardly sloped baffle said baffle angled upward from the vessel floor providing egress only over the top of said baffle, to carry the flow up and away from the zone of entry thereby providing quieting of the turbulence and encouraging release of the lighter material from the heavier liquid of said emulsion, said charging at a rate of flow that allows said emulsion to break;
   (b) flowing liquid sulfur and solvent out of said first zone into a second zone contained by a second baffle, within said second zone flowing said solvent over a trapout weir into a collecting chamber and removing said solvent from said chamber;
   (c) flowing said liquid sulfur under said baffle into a third zone contained by a restraining weir of sufficient height to maintain operating levels in said first and second zones; and
   (d) flowing liquid sulfur over said restraining weir for collection and removal from said vessel.

2. A method of claim 1 wherein said vessel is maintained at a temperature in the range of about 240° to about 310° F.

3. A method of claim 1 wherein said solvent is selected from compounds of the formula R—OH in which the R is a radical selected from:

the aliphatic hydrocarbon radicals of 8–40 carbon atoms, the aliphatic hydrocarbon radicals of 8–40 carbon atoms with 1 to 3 hydroxy substituents, and the radicals of the formula:

$$R_1-(O-R_2)_n-$$

in which $R_1$ is hydrogen or a monovalent aliphatic hydrocarbon radical of 1–20 carbon atoms, $R_2$ is a divalent aliphatic hydrocarbon radical of 2–10 carbon atoms and $n$ is an integer from 1 to 20.

4. A method of claim 3 wherein said solvent has dissolved therein a catalyst consisting of a salt formed between a metal of Groups I-A and II-A of the periodic Table and an organic polycarboxylic acid at least one acid group of which is esterified by the compound R—OH.

5. A method of claim 3 wherein said solvent is polyethylene glycol.

* * * * *